United States Patent Office 3,386,815
Patented June 4, 1968

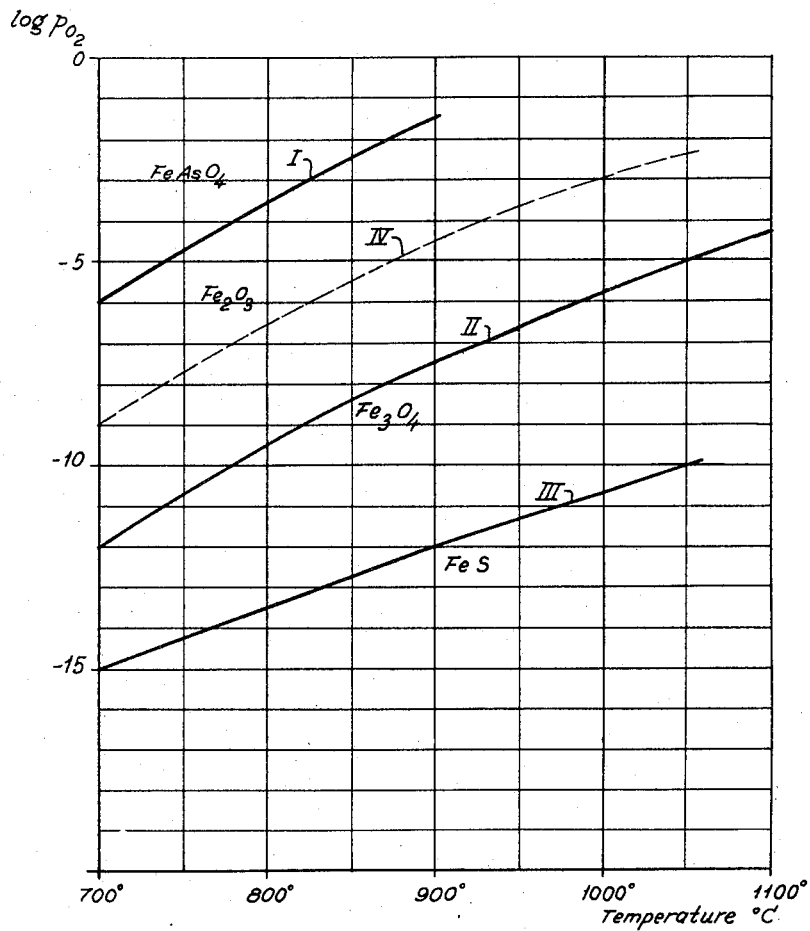

3,386,815
PROCESS FOR ROASTING IRON
SULFIDE MATERIALS
Karl Göran Görling, Lidingo, and Sven Anders Lundqvist, Skelleftehamn, Sweden, assignors to Boliden Aktiebolag, a limited joint-stock company of Sweden
Filed Nov. 4, 1965, Ser. No. 506,381
Claims priority, application Canada, May 21, 1965, 931,310
14 Claims. (Cl. 75—9)

ABSTRACT OF THE DISCLOSURE

Arsenic-containing iron sulfidic material, alone or in admixture with iron oxides, is roasted in the presence of an oxygen-containing gas wherein the partial pressure of oxygen is below a curve, in a log $P_{O_2}$-temperature binary coordinate graph, passing through the points:

| Log $P_{O_2}$ (P in atm.)— | Temp., ° C. |
|---|---|
| −9.0 | 700 |
| −6.5 | 800 |
| −4.5 | 900 |
| −3.0 | 1000 |
| −2.3 | 1050 |

---

The present invention relates to a one-stage process for roasting iron sulfide materials, such as pyrites and pyrrhotite, in order to obtain a roasted iron oxide product substantially free from arsenic and sulfur, and is particularly concerned with an improved process for roasting said materials, which may or may not contain arsenic, in a comminuted state, according to the fluidized bed principle.

In the case of minerals containing arsenic, in conventional fluidized bed roasting, the arsenic forms in the presence of oxygen, with $Fe_2O_3$ water-insoluble and heat resistant iron arsenate, which contaminates the cinders and renders them unsuitable as a raw material for the production of iron and steel.

In the roasting of arsenic-containing iron-sulfide materials in a fluidized bed the presence of arsenic has always been a problem, and it has been proposed, inter alia, to perform the roasting operation in two stages, to reduce the arsenic content of the roasted product to an acceptable level, i.e., to a level which has no material importance with respect to the final use of the cinder product, for instance as a charging material for the production of iron and steel. However, the roasting in two stages requires a much more complicated roasting equipment and more expenditure of energy, work and supervision.

We have found that iron sulfide materials, such as pyrites and pyrrhotite, may be roasted to magnetite and sulfur dioxide and simultaneous removal of possible arsenic present, if the roasting operation is carried out with approximately the theoretical amount of air, oxygen-enriched air or oxygen required for the formation of magnetite ($Fe_3O_4$). By carrying out the roasting operation in this way, a minor amount of elementary sulfur will be present in the roaster gases. After separating the cinders at such high a temperature that the vapors of elementary sulfur and possible arsenic do not condense, the partial pressure of oxygen of the hot roaster gases is increased to effect a complete combustion of sulfur in the roaster gases in the absence of the cinders. Especially in the case of roasting arsenic containing iron sulfide materials at high temperatures where the dissociation of iron arsenate ($FeAsO_4$) begins to manifest itself to an appreciable degree, we have now surprisingly found that it is possible to carry out the roasting operation with more liberty with respect to the choice of the pyrite-to-air ratio.

A principal object of the present invention is therefore to provide a process for roasting arsenic-containing iron sulfide materials, such as pyrites and pyrrhotite, under selected conditions of temperatures and partial pressures of oxygen, in order to counteract reactions of sulfur, arsenic and compounds thereof with the roasted product, and to obtain a roasted product substantially free from sulfur and arsenic.

It is a further object of the invention to provide a process for co-roasting iron sulfide materials, of the kind stated, with magnetitic or hematitic iron oxide materials such as cinders or ore, in a fluidized bed under selected conditions, of temperatures and partial pressures of oxygen, in order to decrease the arsenic and sulfur content and to obtain the product in a hot condition.

Another object of the invention is to provide a process for roasting iron sulfide material, of the kind stated, in a fluidized bed under selected conditions of temperatures and partial pressures of oxygen, in order to obtain a roasted product predominantly in the form of magnetite substantially free from sulfur and arsenic.

There will be special advantages in enabling magnetic concentration. Possible impurities of lead and/or antimony are driven off in the form of sulphides under the reduction conditions according to the invention.

It was observed during our test that approximately 85% of the impurities were driven off whereas conventional fluidized roasting processes do not give such a high result.

Furthermore the hot cinders taken from the roasting process can be refined immediately, e.g. chlorinating volatilization of elements such as copper, zinc, residual arsenic, lead and sulfur, non-desirable in the manufacture of iron.

The processes involved in the present invention may be best understood with reference to the attached graph showing the conditions prevailing in roasting a conventional arsenical iron sulfide material containing 0.5% As. Even a fairly appreciable variation of the As content has no material influence upon the curves defining the thermodynamically calculated zones of existence of $FeAsO_4$, $Fe_2O_3$, $Fe_3O_4$ and FeS, respectively. In the graph the partial pressures of oxygen, in atmospheres, are expressed in terms of log $P_{O_2}$, as the ordinate, and are plotted against the temperature in degrees centigrade, as the abscissa. As will be seen from the graph, $FeAsO_4$ exists above curve I passing through the following points of the graph.

| Log $P_{O_2}$ (atm.): | Temp., ° C. |
|---|---|
| −6.0 | 700 |
| −3.5 | 800 |
| −1.5 | 900 |

This means that, according to the present invention, in order to counteract the formation of $FeAsO_4$, the roasting operation must be conducted under such conditions that, at the selected temperature, the partial pressure of oxygen is maintained at a value not exceeding the maximum value defined by the curve demarcating the zones within which $FeAsO_4$ and $Fe_2O_3$ exist.

As will be seen from the graph, when roasting at a selected temperature and partial pressure of oxygen below curve I, the cinders will be obtained substantially free from arsenic. However, in order to avoid undesirable reactions between the gases and the solids suspended in the roasting gases, the cinders are separated therefrom under substantially the same conditions as those maintained during the roasting operation proper.

According to a second embodiment of the invention the roasting operation is conducted under conditions promoting the formation of magnetite, $Fe_3O_4$. As will be seen from the graph, in this case the roasting operation must be conducted under such conditions that the partial pressure of oxygen of the resulting roasting gases lies below the pressure-temperature curve II, which demarcates the zones within which $Fe_2O_3$ and $Fe_3O_4$ exist, i.e., through the following points of the graph.

| Log $P_{O_2}$ (atm.): | Temp., ° C. |
|---|---|
| −12.0 | 700 |
| −9.5 | 800 |
| −7.5 | 900 |
| −5.8 | 1000 |
| −5.0 | 1050 |

Accordingly, when roasting under such conditions the roasted product will be obtained predominantly in the form of magnetite substantially free from sulfur and possible arsenic or compounds thereof. However, in order to oxidize or to prevent the formation of FeS, the roasting must be conducted under such conditions that, at the selected temperature, the partial pressure of oxygen is maintained at a value above curve III which demarcates the zones within which $Fe_3O_4$ and FeS exist, i.e., through the following point of the graph.

| Log $P_{O_2}$ (atm.): | Temp., ° C. |
|---|---|
| −15.0 | 700 |
| −13.5 | 800 |
| −12.0 | 900 |
| −10.7 | 1000 |
| −10.0 | 1050 |

It should be observed that curves I, IV, II and III represent the thermodynamically calculatetd demarcations of the zones of existence of $FeAsO_4$, $Fe_2O_3$, $Fe_3O_4$ and FeS, respectively.

The establishment of equilibrium is largely dependent on the grain size of the charging material and the retention time in the furnace. When roasting a finely grained pyrite such as a flotation concentrate, the equilibrium is established very rapidly, but the retention time in the furnace is short since the roasted product is for the most part removed from the furnace suspended in the hot roasting gases. On the other side, when roasting a more coarse-grained material, such as one having a particle size of up to 5 mm. in diameter, the equilibrium is established more slowly but the material is maintained during a longer time in the furnace since it is predominantly discharged from the bed.

In order to avoid the formation of $FeAsO_4$ despite possible fluctuations of the air supply or temperature, the roasting of arsenic-containing iron sulfide materials is preferably performed, at the actual roasting temperature, under a partial pressure of oxygen which lies considerably below curve I. Therefore, in the roasting of arsenic-containing iron sulfide materials, oxygen, or a gas containing oxygen is preferably supplied in amounts sufficient to establish, within the furnace space, an oxygen partial pressure below curve IV which passes through the following points of the graph.

| Log $P_{O_2}$ (atm.): | Temp., ° C. |
|---|---|
| −9.0 | 700 |
| −6.5 | 800 |
| −4.5 | 900 |
| −3.0 | 1000 |
| −2.3 | 1050 |

Similarly, when roasting to $Fe_3O_4$, the partial pressure of oxygen, at the actual roasting temperatures, should, firstly, be maintained well below curve II, in order to avoid the formation of $Fe_2O_3$ and, secondly, well above curve III, in order to avoid the formation of FeS.

According to another embodiment of the invention, after separating the cinders inside or outside the furnace space, the oxygen partial pressure of the hot gases is increased by injecting oxygen or a gas containing oxygen such as air, to effect an oxidation of elementary sulfur, arsenic and compounds thereof in the absence of the cinders.

Thus, despite the fact that arsenic may be expelled at a surprisingly high partial pressure of oxygen, this is nevertheless so low that elementary sulfur, arsenic and compounds thereof may appear in the roaster gases. For this reason, after the separation of the bulk of the cinders, a small amount of oxygen-containing gases is supplied to the hot roasting gases.

In the roasting of finely grained flotation concentrates the cinders are commonly not separated within the furnace chamber, although such separation is also possible when using an amply dimensioned furnace shaft with a limited throughput. In the roasting of a flotation concentrate the cinders are generally separated from the hot gases in a heat separator outside the furnace, for instance a heat cyclone. The arsenic-containing dust not separated from the hot roaster gases in the heat separator and which, after the combustion of sulfur, arsenic and compounds thereof, contains arsenic, can be deposited in scrubbers or electrical filters. The separated arsenic-containing dust may be recycled to the furnace for repeated treatment, if desired after agglomeration.

On the other side, when roasting a coarse-grained iron sulfide material the cinders are generally separated in the furnace space and discharged from the bed. The gases within the furnace space above the fluidized bed or leaving the furnace contain elementary sulfur and arsenic compounds. The combustion of these elements may be effected either in the upper part of the furnace space or, for instance, in a special combustion chamber connected to the furnace. To separate the arsenic and sulfur the collected dust may be returned to the roasting furnace, advantageously in agglomerated form.

According to a further embodiment of the invention, iron sulfide materials, such as pyrites and pyrrhotite, are co-roasted with hematitic or magnetitic iron oxide materials such as cinders or ore, in a fluidized bed at temperatures within the range of 700 to 1100° C. while introducing oxygen or a gas containing oxygen in amounts sufficient to establish within the furnace space, together with the oxygen of said iron oxide materials, an oxygen partial pressure of the resulting roaster gases below the pressure-temperature curve I of the graph of the figure, i.e., under such conditions that neither sulfur nor arsenic, if present, condense, whereafter the hot roasting gases are subjected to an increased partial pressure of oxygen by admission of air or other oxygen-containing gases or oxygen, thereby effecting an after-combustion of elementary sulfur and arsenic or compounds thereof present in the roaster gases. By this separation the formation of insoluble and heat-resistant iron arsenate is avoided.

Certain types of iron sulfide minerals are susceptible to high temperature in the fluidized bed. This is especially the case with iron sulfide minerals rich in gangue which have a tendency for sintering and defluidizing the bed. Although the bed temperature for this reason must not rise to a hazardous level, it is possible to reach a high reaction temperature within the space above the fluidized bed by effecting a part of the combustion above the bed, to obtain a higher temperature than that prevailing in the bed. This may be effected in several ways, for instance by supplying deficient air through the bed and injecting secondary air above the bed and/or to introduce the iron sulfide material into the bed in such a manner that a part thereof will not be roasted within the bed but in the space thereabove, whereby the risk of the bed sintering and being defluidized is eliminated.

In conventional pyrite roasting with excess of air hematitic cinders are obtained in large quantities. According to the present invention it is possible to convert these hematitic cinders to a charging material of high quality suitable for iron works by co-roasting such hematitic cinders with pyrites. Furthermore, pyrite cinders often contain arsenic which is driven off in the roasting operation. Due to the possibility of co-roasting hematitic pyrite cinders with pyrite concentrates by the process according to the present invention, this is not only converted to a desirable magnetitic roasted product but may be also prepared by drying and heating, for an immediate further treatment, e.g., reduction or hot briquetting.

Example 1

Practical tests have been carried out in continuous operation for some weeks in a furnace of the BASF type (Badische Anilin & Sodafabrik AG), into which the feed, consisting of a mixture of 50% of an arsenical pyrite from Bolidens Gruvaktiebolag and 50% of arsenical hematitic pyrite cinders obtained from the same kind of pyrite, was charged at a rate of approximately 1 ton/hr. The pyrite cinders entrained from the furnace by the roaster gases were separated in two heat cyclones connected in series. The feed contained in total 0.30% As. The charge was roasted at a temperature within the bed of 750° C., the temperature within the furnace shaft being 950° C. The resulting cinders contained 92% magnetite with a residual As content of 0.03% and S content of 0.6%. With respect to its low arsenic content the roasted product was therefore suitable as a charging material for the production of iron and steel.

Example 2

When roasting a flotation pyrite from Bolidens Gruvaktiebolag, containing 0.4% As, in a Dorr furnace adapted for wet charging and having an output of approximately 25 to 35 tons/24 hrs., and provided with two hot cyclones connected in series, the pyrite-to-air ratio was adjusted to obtain a minute sublimation of elementary sulfur. Thereafter 8% of this air flow was diverted to the second cyclone to effect an after-combustion of subliming sulfur and arsenic compounds. In this operation a roasted product containing less than 0.06% As and less than 0.5% S was obtained under continuous operation of the process. The iron contained in the roasted product was combined as magnetite to almost 100%.

Example 3

When roasting a copper-containing finely grained pyrite having a particle size below 8 mm., a sulfur content of 47 to 48% and an As content of 0.4% in a pilot plant scale furnace of the BASF type (appr. 100 kg./hr.) at about 920° C., an arsenic volatilization of approximately 85% and a roasted product containing appr. 0.3% S and 0.08% As was obtained.

In roasting according to the present invention the hematitic material can be uniformly mixed with the finely divided iron sulfide material and the thus prepared mixture in dry or aqueous condition fed to the roasting furnace. It is also possible to charge the hematitic cinders separately into the furnace in a dry or aqueous condition.

A substantial saving in heat energy can be obtained if the hematitic cinders are taken directly from a conventional roasting furnace and fed in a hot condition into the fluidizing furnace in which the pyrite roasting is performed.

In roasting according to the new process hematitic cinders or ore may be added practically in arbitrary quantities to the limit where the exothermic reaction ceases to be self-sustaining, for example, up to 70% by weight of the total charge.

It should be observed that in co-roasting iron sulfide materials with hematitic cinders or ore, the oxygen content of the ferric oxide can be utilized as an oxidation agent, and thus the supply of oxygen-containing gases may be reduced correspondingly, with the resulting additional advantage that a higher content of $SO_2$ in the gases leaving the furnace is obtained.

In certain cases it may be preferred to subject magnetitic cinders or ore to a heat treatment, in order to remove S and/or As. Such a heat treatment may advantageously be effected in connection with roasting iron sulfide materials according to the process of the invention, whereby an oxidation of $Fe_3O_4$ to $Fe_2O_3$ is avoided. By this process, the roasted product is obtained in a hot condition which is advantageous if a further treatment, for instance a reduction and, if desired, a subsequent refinement is to be carried out immediately after the roasting operation.

By co-roasting hematitic or magnetitic cinders or ore, on one side, and iron sulfide materials, on the other side, it is possible to obtain a homogenously roasted product the composition of which may be controlled arbitrarily within desired limits.

By co-roasting iron sulfide materials with hematitic or magnetitic cinders or ore according to the present invention it is possible to control the roasting temperatures by variation of the amounts of oxide materials charged to the fluidized bed in relation to the amounts of iron sulfide material charged. A temperature control may also be effected in a known manner by charging the materials to be roasted in a humid or wet condition, or by injecting water directly in the furnace. Thereby the roasting operation may be performed under strict temperature control without the use of auxiliary indirect cooling means in the fluidized bed or furnace space.

What is claimed is:

1. A process for roasting arsenic containing iron sulfide materials, such as pyrites and pyrrhotite, which comprises roasting said material in a furnace according to the fluidized bed principle at temperatures within the range 700 to 1100° C. while introducing oxygen or a gas containing oxygen in amounts sufficient to establish, within the furnace space, an oxygen partial pressure of the resulting roaster gases below a pressure-temperature curve which in a binary co-ordinate system, wherein the partial pressure of oxygen in atmospheres, expressed in terms of $\log P_{O_2}$, as the ordinate is plotted against the temperature in degrees centigrade, as the abscissa passes through the following points:

| $\log P_{O_2}$ (atm.) | Temp., °C. |
|---|---|
| −9.0 | 700 |
| −6.5 | 800 |
| −4.5 | 900 |
| −3.0 | 1000 |
| −2.3 | 1050 | in order to liberate sulfur, arsenic and compounds thereof, separating the major part of the cinders from the hot roaster gases while maintaining the conditions stipulated for the temperature and partial pressure of oxygen, in order to counteract secondary reactions of arsenic and compounds thereof with the cinders and to obtain the cinders substantially free from sulfur and arsenic.

2. The process according to claim 1, in which a major part of the cinders is separated from the hot roaster gases while maintaining the conditions stipulated for the temperature and partial pressure of oxygen.

3. The process according to claim 2, in which after separating a major part of the cinders from the hot roaster gases, the oxygen partial pressure of the hot roaster gases is increased by injecting oxygen or oxygen-containing gases into the roaster gases in order to effect an oxidation of sulfur, arsenic and compounds thereof.

4. The process according to claim 2, in which the dusty cinders remaining in the roaster gases after the separation of the main part of the cinders, are separated from the roaster gases and returned to the fluidized bed.

5. The process according to claim 2, in which a major part of the cinders is separated from the gases inside the furnace and discharged from the bed whereas that part of the cinders which is entrained by the roaster gases is separated from said gases outside the furnace and returned to the fluidized bed.

6. The process according to claim 2, in which the dusty cinders remaining in the roaster gases after the separation of the main part of the cinders, are separated from the roaster gases, agglomerated and returned to the fluidized bed.

7. A process for roasting iron sulfide minerals, such as pyrites and pyrrhotite, which comprises co-roasting said material with iron oxide materials selected from the group consisting of hematitic and magnetitic cinders and ore, in a furnace according to the fluidized bed principle at temperatures within the range 700 to 1100° C. while introducing oxygen or a gas containing oxygen in amounts sufficient to establish, within the furnace space, together with the oxygen of said iron oxide materials, an oxygen partial pressure of the resulting roaster gases below a pressure-temperature curve which in a binary co-ordinate system, wherein the partial pressure of oxygen in atmospheres, expressed in terms of log $P_{O_2}$, as the ordinate, is plotted against the temperature in degrees centigrade as the abscissa, passes through the following points:

| Log $P_{O_2}$ (atm.)— | Temp., ° C. |
|---|---|
| −12.0 | 700 |
| −9.5 | 800 |
| −7.5 | 900 |
| −5.8 | 1000 |
| −5.0 | 1050 | but not below a pressure-temperature curve passing through the following points plotted in the same co-ordinate system:

| Log $P_{O_2}$ (atm.)— | Temp., ° C. |
|---|---|
| −15.0 | 700 |
| −13.5 | 800 |
| −12.0 | 900 |
| −10.7 | 1000 |
| −10.0 | 1050 | in order to liberate sulfur and compounds thereof and to obtain the cinders predominantly in the form of magnetite substantially free from sulfur.

8. The process according to claim 7 in which a major part of the cinders is separated from the hot gases while maintaining the conditions stipulated for the temperature and partial pressure of oxygen.

9. The process according to claim 8, in which after separating a major part of the cinders from the hot roaster gases, the oxygen partial pressure of the hot roaster gases is increased by injecting oxygen or oxygen containing gases into the roaster gases in order to effect an oxidation of sulfur and compounds thereof.

10. The process according to claim 8, in which the dusty cinders remaining in the roaster gases after the separation of the main part of the cinders, are separated from the roaster gases and returned to the fluidized bed.

11. The process according to claim 8 in which a major part of the cinders is separated from the gases inside the furnace and discharged from the bed whereas that part of the cinders which is entrained by the roaster gases is separated from said gases outside the furnace and returned to the fluidized bed.

12. The process according to claim 8, in which the dusty cinders remaining in the roaster gases after the separation of the main part of the cinders, are separated from the roaster gases, agglomerated and returned to the fluidized bed.

13. The process according to claim 7, which comprises roasting arsenic-containing iron sulfide materials.

14. A process according to claim 1 wherein said arsenic-containing iron sulfide material is admixed with an iron oxide material selected from the group consisting of hematitic and magnetitic cinders and ore.

References Cited

UNITED STATES PATENTS

| | | | |
|---|---|---|---|
| 2,596,580 | 5/1952 | McKay et al. | 75—9 |
| 2,766,102 | 10/1956 | Lewis et al. | 75—9 |
| 2,796,340 | 6/1957 | Cyr et al. | 75—9 |
| 2,978,297 | 4/1961 | Pfannmueller et al. | 75—9 |
| 2,993,778 | 7/1961 | Johannsen et al. | 75—9 |
| 3,169,853 | 2/1965 | Van Es | 75—9 |

FOREIGN PATENTS 857,867  1/1961  Great Britain.

BENJAMIN HENKIN, *Primary Examiner.*